May 8, 1951 J. C. PFEIFER ET AL 2,551,899
SICKLE WITH STEPPED OUTER CUTTING EDGE
Filed May 8, 1945
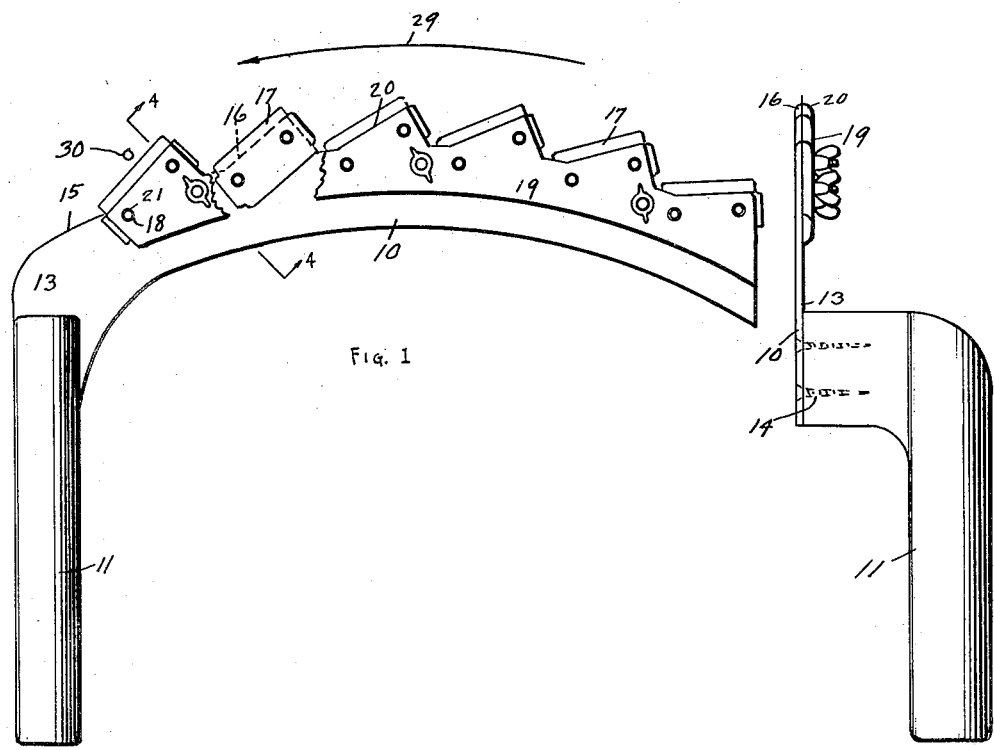
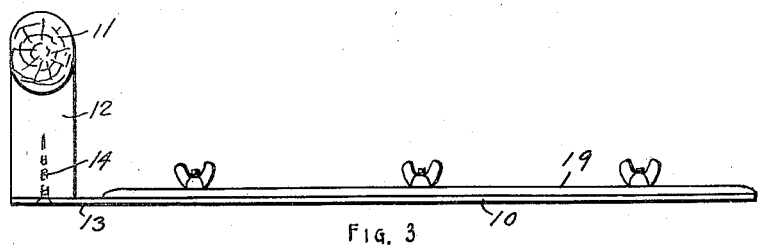
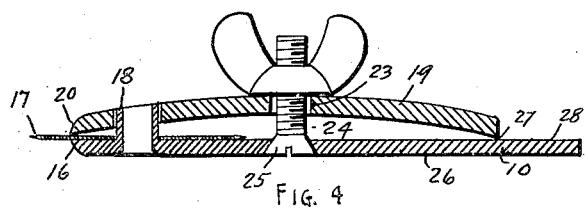
INVENTORS
J.C. PFEIFER & L.L. LAASE
BY E.B. Birkenbeuel
ATTORNEY Patented May 8, 1951

2,551,899

UNITED STATES PATENT OFFICE 2,551,899

SICKLE WITH STEPPED OUTER CUTTING EDGE

John C. Pfeifer and Leland L. Laase, Vancouver, Wash.

Application May 8, 1945, Serial No. 592,564

3 Claims. (Cl. 30—299)

This invention relates generally to grass cutting implements and particularly to a sickle.

The main object of this invention is to construct a sickle for cutting grass easily and quickly close to the surface of the ground.

The second object is to provide a sickle with improved cutting action and to utilize discarded razor blades as the cutting elements thereof.

The third object is to so construct the sickle that the blades will provide a slicing action and will engage the grass successfully.

The fourth object is to so construct the sickle that it is easy to manufacture and that the blades can be turned or replaced without the use of tools or expending much time.

The fifth object is to so construct a sickle that the cutting action is a normal one and that it is less dangerous to the user than is the ordinary conventional sickle.

We accomplish these and other objects in a manner set forth in the following specification as illustrated in the accompanying drawing, in which Fig. 1 is a plan of the sickle with a portion broken away to disclose one of the blades.

Fig. 2 is a side elevation of Fig. 1.

Fig. 3 is a rear elevation of Fig. 1.

Fig. 4 is a section taken along the line 4—4 in Fig. 1.

Similar numerals refer to similar parts throughout the several views.

Referring in detail to the drawing, there is shown a curved frame 10, on one end of which is mounted the horizontal handle 11 whose downturned end 12 is secured to the end 13 of the frame 10, by means of the screws 14. The edge 15 of the frame 10 is stepped along the lines 16, which are spaced sufficiently to receive the wafer razor blades 17, which are positioned by the tubular projections 18 punched out of the material in the frame 10.

A curved clamp 19, having the stepped edges 20 which conform with the edges 16, and having perforations 21 which freely receive the tubular projections 18, is provided with three openings 23, which receive the flat headed bolts 24 each having its head 25 flush with the under side 26 of the frame 10. The clamp 19 is preferably dished, as illustrated, so that its heel 27 rests on the top surface 28 of the frame 10 while the stepped edges 20 bear against the edges 16 or the wafer blade 17 held therebetween.

In the operation of this sickle, the handle 11 is grasped in the hand, the frame 10 caused to move in an arcuate path somewhat parallel to the arrow 29, causing it to give a glancing or slicing blow to the stem 30 and effectively sever same. Obviously, if any of the corners are broken from the blade, they need merely be turned over or end for end in order to present a new corner and a new cutting edge.

It can be seen from the foregoing that we have provided an exceedingly simple and efficient form of sickle in which discarded razor blades can be used to provide the finest type of grass cutting edge.

We are aware that numerous forms of sickles have been constructed in the past and it is therefore not our intention to cover such inventions broadly, but we do intend to cover all such forms and modifications thereof as fall fairly within the appended claims.

We claim:

1. A sickle consisting of an arcuate handled frame having a stepped convex outer edge, and means for holding a cutting blade along each step with the cutting edges of the blades radiating from the end of said handle nearest said frame.

2. A sickle consisting of a curved frame having an L-shaped handle at one end of said frame, said handle being offset from said blade, the outer edge of said frame being convex and the ends of said frame lying in a plane normal to the outermost end of said handle, said convex edge being stepped in radial lines starting from the outermost handle end and a clamp for securing wafer blades against said frame and beyond the radial faces of said frame.

3. A sickle consisting of a flat frame having one stepped convex outer edge, a handle attached to one end of said frame whose end of attachment forms a radial center for said steps, a stepped clamp for said frame, and means for holding wafer cutting blades between said clamp and frame.

JOHN C. PFEIFER.
LELAND L. LAASE.

REFERENCES CITED

The following references are of record in the file of this patent:

UNITED STATES PATENTS

| Number | Name | Date |
|---|---|---|
| 898,535 | Volckmann | Sept. 15, 1908 |
| 2,070,190 | Wells | Feb. 9, 1937 |

FOREIGN PATENTS

| Number | Country | Date |
|---|---|---|
| 629,343 | Germany | Apr. 28, 1936 |